United States Patent
Lee

(10) Patent No.: US 11,815,603 B2
(45) Date of Patent: Nov. 14, 2023

(54) LIDAR DEVICE AND OPERATING METHOD OF THE SAME

(71) Applicant: SAMSUNG ELECTRONICS CO., LTD., Suwon-si (KR)

(72) Inventor: Jisan Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 791 days.

(21) Appl. No.: 16/852,645

(22) Filed: Apr. 20, 2020

(65) Prior Publication Data

US 2021/0149053 A1    May 20, 2021

(30) Foreign Application Priority Data

Nov. 19, 2019 (KR) .................. 10-2019-0149115

(51) Int. Cl.
| | | |
|---|---|---|
| G01S 17/89 | (2020.01) | |
| G01S 7/484 | (2006.01) | |
| G01S 7/4865 | (2020.01) | |

(52) U.S. Cl.
CPC .............. *G01S 17/89* (2013.01); *G01S 7/484* (2013.01); *G01S 7/4865* (2013.01)

(58) Field of Classification Search
CPC .......... G01S 17/10; G01S 17/42; G01S 17/89; G01S 17/931; G01S 7/4802; G01S 7/4808; G01S 7/4817; G01S 7/484; G01S 7/4861; G01S 7/4865; G01S 7/4876; G01S 7/497

See application file for complete search history.

(56) References Cited

U.S. PATENT DOCUMENTS

| | | |
|---|---|---|
| 8,736,820 B2 | 5/2014 | Choe et al. |
| 10,132,928 B2 | 11/2018 | Eldada et al. |
| 2015/0293224 A1 | 10/2015 | Eldada et al. |
| 2015/0346340 A1 | 12/2015 | Yaacobi et al. |
| 2016/0049765 A1 | 2/2016 | Eldada |
| 2016/0161600 A1 | 6/2016 | Eldada et al. |
| 2017/0184450 A1 | 6/2017 | Doylend et al. |

(Continued)

FOREIGN PATENT DOCUMENTS

| | | |
|---|---|---|
| JP | 4549587 B2 | 9/2010 |
| KR | 10-0899820 B1 | 5/2009 |

(Continued)

OTHER PUBLICATIONS

Communication dated Oct. 8, 2020, from the European Patent Office in counterpart European Application No. 20175892.7.

(Continued)

*Primary Examiner* — Maria E Vazquez Colon
(74) *Attorney, Agent, or Firm* — Sughrue Mion, PLLC

(57) ABSTRACT

A method of operating a light detection and ranging (LiDAR) device includes obtaining receiving signals corresponding to reference laser pulses generated from a reference signal; obtaining a main receiving signal having a maximum value among the receiving signals with respect to a time point; correcting a value of a sub-receiving signal included in the receiving signals at the time point based on the maximum value of the main receiving signal; and obtaining a time of flight (ToF) of a laser pulse corresponding to the sub-receiving signal based on a correlation between the corrected value of the sub-receiving signal and the reference signal.

17 Claims, 15 Drawing Sheets

(56) References Cited

U.S. PATENT DOCUMENTS

| | | |
|---|---|---|
| 2018/0107091 A1 | 4/2018 | Hosseini et al. |
| 2018/0321569 A1 | 11/2018 | Spector et al. |
| 2019/0101633 A1 | 4/2019 | Warke et al. |
| 2019/0154812 A1* | 5/2019 | Meng .................. G01S 7/4863 |
| 2019/0219675 A1 | 7/2019 | Yoon et al. |
| 2021/0055392 A1 | 2/2021 | Lee et al. |

FOREIGN PATENT DOCUMENTS

| | | |
|---|---|---|
| WO | 2017138032 A1 | 8/2017 |
| WO | WO-2017138032 A1 * | 8/2017 |
| WO | 2018/204658 A1 | 11/2018 |

OTHER PUBLICATIONS

Komljenovic, Tin et al., "Sparse aperiodic arrays for optical beam forming and LIDAR", Optics Express, Feb. 6, 2017, vol. 25, No. 3, pp. 2511-2528. (18 pages total).

Hutchison, David N. et al., "High-resolution aliasing-free optical beam steering", OPTICA, Aug. 5, 2016, vol. 3, No. 8, pp. 887-890. (4 pages total).

Chung, Sungwon et al., "A 1024-Element Sclable Optical Phased Array in 0.18um SOI CMOS", 2017 IEEE International Solid-State Circuits Conference, Feb. 7, 2017. (3 pages total).

Miller, Steven A. et al., "Large-scale optical phased array using a low-power multi-pass silicon photonic platform", OPTICA, Jan. 2, 2020, vol. 7, No. 1, pp. 3-6. (4 pages total).

* cited by examiner

LIDAR DEVICE AND OPERATING METHOD OF THE SAME

CROSS-REFERENCE TO RELATED APPLICATION

This application claims priority from Korean Patent Application No. 10-2019-0149115, filed on Nov. 19, 2019, in the Korean Intellectual Property Office, the disclosure of which is incorporated herein by reference in its entirety.

BACKGROUND

1. Field

Apparatuses and methods consistent with example embodiments relate to a light detection and ranging (LiDAR) device and an operating method of the same.

2. Description of Related Art

Light detection and ranging (LiDAR) devices are applied to various fields, for example, aerospace, geology, three-dimensional (3D) maps, vehicles, robots, or drones. The LiDAR device uses a method of measuring a time of flight (ToF) of light as a basic operation principle. For example, the LiDAR device may radiate light toward an object and receive the light through a sensor, and may measure a ToF by using a high-speed electric circuit. Furthermore, the LiDAR device may calculate a distance to an object from the LiDAR device based on the ToF and generate a depth image of the object by using a distance calculated for each location of the object.

Meanwhile, to enable accurate processing of a depth image by the LiDAR device even in an environment where side lobes are generated in a radiation pattern detected by the LiDAR device, an advanced technology to measure a ToF of light may be needed.

SUMMARY

Various embodiments provide a light detection and ranging (LiDAR) device and an operating method of the same. The technical objectives to be achieved by the disclosure are not limited to the above-described objectives, and other technical objectives may be inferred from the following embodiments.

Additional aspects will be set forth in part in the description which follows and, in part, will be apparent from the description, or may be learned by practice of the presented embodiments of the disclosure.

According to an example embodiment, there is provided a method of operating a light detection and ranging (LiDAR) device, the method including: obtaining receiving signals corresponding to reference laser pulses generated from a reference signal; obtaining a main receiving signal having a maximum value among the receiving signals with respect to a time point; correcting a value of a sub-receiving signal included in the receiving signals at the time point based on the maximum value of the main receiving signal; and obtaining a time of flight (ToF) of a laser pulse corresponding to the sub-receiving signal based on a correlation between the corrected value of the sub-receiving signal and the reference signal.

The correcting of the value of the sub-receiving signal may include subtracting a value obtained by multiplying the maximum value by a correction factor, from the value of the sub-receiving signal at the time point.

The correcting of the value of the sub-receiving signal may include correcting the value of the sub-receiving signal at the time point, based on a correction factor that is a ratio of an intensity of a side lobe to an intensity of a main lobe of a laser pulse transmitted by the LiDAR device.

The correcting of the value of the sub-receiving signal may include correcting the value of the sub-receiving signal at the time point, based on an angle at which a side lobe is generated with respect to a main lobe of a laser pulse transmitted by the LiDAR device.

The sub-receiving signal may include a receiving signal corresponding to a scan angle deviated by the angle at which the side lobe is generated from a scan angle of the LiDAR device corresponding to the main receiving signal.

The obtaining of the main receiving signal may include: synchronizing the receiving signals; and comparing the receiving signals by time.

The obtaining of the receiving signals may include: transmitting each of the reference laser pulses for each of scan angles in one direction in a field of view of the LiDAR device; and obtaining the receiving signals respectively corresponding to the reference laser pulses for each of the scan angles and storing the obtained receiving signal in a memory.

The obtaining of the main receiving signal may include: calculating a cross-correlation function between the sub-receiving signal and the reference signal; determining a first time point when a value of the cross-correlation function has the maximum value; and determining the ToF based on a time period from a second time point when a laser pulse transmitted from the LiDAR device corresponds to the sub-receiving signal to the first time point when the value of the cross-correlation function has the maximum value.

The obtaining of the main receiving signal may include: obtaining a first main receiving signal and a second main receiving signal among the receiving signals, each of the first main receiving signal and the second main receiving signal having a first maximum value and a second maximum value with respect to a first time point and a second time point, respectively. The correcting of the value of the sub-receiving signal may include: obtaining a first scan angle of the first main receiving signal and a second scan angle of the second main receiving signal; determining whether a difference between the first scan angle and the second scan angle matches an angle at which a side lobe is generated, with respect to a field of view of the LiDAR device; when the difference between the first scan angle and the second scan angle is determined to match the angle at which a side lobe is generated, correcting a value of the first main receiving signal at the first time point and a value of the second main receiving signal at the second time point; and when the difference between the first scan angle and the second scan angle is not determined to match the angle at which a side lobe is generated, not correcting the value of the first main receiving signal at the first time point and the value of the second main receiving signal at the second time point.

According to an example embodiment, there is provided a non-transitory computer readable recording medium having recorded thereon a program for executing the method of operating a light detection and ranging (LiDAR) device.

According to an example embodiment, there is provided a light detection and ranging (LiDAR) device including: an antenna configured to transmit and receive laser pulses; and a processor configured to: obtain receiving signals corresponding to reference laser pulses generated from a reference signal; obtain a main receiving signal having a maximum value among the receiving signals with respect to a time point; correct a value of a sub-receiving signal included in the receiving signals at the time point based on the maximum value of the main receiving signal, and obtain a time of flight (ToF) of a laser pulse corresponding to the sub-receiving signal based on a correlation of the corrected sub-receiving signal and the reference signal.

The processor may be further configured to subtract a value obtained by multiplying the maximum value by a correction factor, from the value of the sub-receiving signal at the time point.

The processor may be further configured to correct the value of the sub-receiving signal at the time point, based on a correction factor that is a ratio of an intensity of a side lobe to an intensity of a main lobe of a laser pulse transmitted by the LiDAR device.

The processor may be further configured to correct the value of the sub-receiving signal at the time point, based on an angle at which a side lobe is generated with respect to a main lobe of a laser pulse transmitted by the LiDAR device.

The sub-receiving signal may include a receiving signal corresponding to a scan angle deviated by the angle at which the side lobe is generated from a scan angle of the LiDAR device corresponding to the main receiving signal.

The processor may be further configured to synchronize the receiving signals and compare the receiving signals by time.

The LiDAR device may include a memory, wherein the processor may be further configured to: transmit each of the reference laser pulses for each of scan angles in one direction in a field of view of the LiDAR device; obtain the receiving signals respectively corresponding to the reference laser pluses for each of the scan angles; and store the obtained receiving signal in the memory.

The processor may be further configured to: calculate a cross-correlation function between the sub-receiving signal and the reference signal; determine a first time point when a value of the cross-correlation function has the maximum value; and determine a time period from a second time point when a laser pulse transmitted from the LiDAR device corresponds to the sub-receiving signal to the first time point when the value of the cross-correlation function has the maximum value.

The processor is further configured to: obtain a first main receiving signal and a second main receiving signal, among the receiving signals, each of the first main receiving signal and the second main receiving signal having a first maximum value and a second maximum value, with respect to a first time point and a second time point, respectively; obtain a first scan angle of the first main receiving signal and a second scan angle of the second main receiving signal; determine whether a difference between the first scan angle and the second scan angle matches an angle at which a side lobe is generated, with respect to a field of view of the LiDAR device; when the difference between the first scan angle and the second scan angle is determined to match the angle at which a side lobe is generated, correct a value of the first main receiving signal at the first time point and a value of the second main receiving signal at the second time point; and when the difference between the first scan angle and the second scan angle is not determined to match the angle at which a side lobe is generated, not correct the value of the first main receiving signal at the first time point and the value of the second main receiving signal at the second time point.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
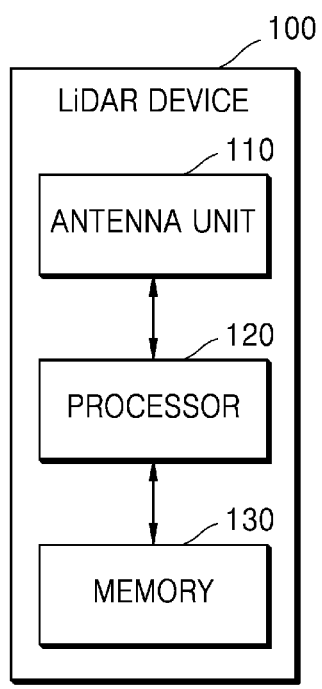
FIG. 1 is a block diagram of an example of a light detection and ranging (LiDAR) device according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

The terms used in the example embodiments have been selected from currently widely used general terms in consideration of the functions in the disclosure. However, the terms may vary according to the intention of one of ordinary skill in the art, case precedents, and the advent of new technologies. Furthermore, for special cases, meanings of the terms selected by the applicant are described in detail in the description section. Accordingly, the terms used in the disclosure are defined based on their meanings in relation to the contents discussed throughout the specification, not by their simple meanings.

Terms such as "include" or "comprise" may not be construed to necessarily include any and all constituent elements or steps described in the specification, but may be construed to exclude some of the constituent elements or steps or further include additional constituent elements or steps.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Example embodiments will be described below in detail with reference to the attached drawings. However, the embodiments may be implemented in various forms and are not limited to the examples described below.

FIG. 1 is a block diagram of an example of a light detection and ranging (LiDAR) device 100 according to an example embodiment Referring to FIG. 1, the LiDAR device 100 may include an antenna unit 110, a processor 120, and a memory 130. The LiDAR device 100 of FIG. 1 is illustrated as including only constituent elements related to example embodiments. Accordingly, other constituent elements that are not shown in FIG. 1 may be further included in the LiDAR device 100.

The memory 130 may be hardware for storing various pieces of data processed in the LiDAR device 100, and may store, for example, pieces of data processed or to be processed in the LiDAR device 100. Furthermore, the memory may store applications or drivers to be executed by the LiDAR device 100.

The memory 130 may include a random access memory (RAM), such as a dynamic random access memory (DRAM) and a static random access memory (SRAM), a read-only memory (ROM), an electrically erasable programmable read-only memory (EEPROM), CD-ROM, Blue-ray or other optical disc storage, a hard disk drive (HDD), a solid state drive (SSD), or a flash memory, and further other external storage device accessible to the LiDAR device 100

The antenna unit 110 may perform a function of converting an electrical signal to a laser pulse and transmitting the converted laser pulse or receiving a laser pulse and converting the received laser pulse to an electrical signal. The laser pulse transmitted by the antenna unit 110 may be a light or electromagnetic radiation pulse. The antenna unit 110 may include a transmitter for transmitting a laser pulse and a receiver for receiving the laser pulse. Furthermore, the antenna unit 110 may include a transceiver for transmitting/receiving a laser pulse.

The processor 120 may perform overall functions to control the LiDAR device 100. The processor 120 may be implemented by an array of a plurality of logic gates, or by a combination of a general purpose microprocessor and a memory for storing programs that are executable in the micro-processor. Furthermore, the processor 120 may include both a signal processor for processing an optical signal or an electrical signal and a computing unit for computing signal values indicated by signals.

When the processor 120 generates a reference signal, the antenna unit 110 may convert the reference signal to a laser pulse and transmit the converted laser pulse. The transmitted laser pulse may be reflected by an object and received by the antenna unit 110. The antenna unit 110 may convert the received laser pulse to a receiving signal and transmit the receiving signal to the processor 120.

The processor 120 may calculate a ToF of a laser pulse by using a correlation between the receiving signal and the reference signal. The receiving signal, which is a signal obtained by the antenna unit 110 as the laser pulse generated based on the reference signal is reflected from the object, has the characteristics identical to or similar to those of the reference signal. Accordingly, when a time point when the correlation between the receiving signal and the reference signal is high is detected, a time point when the laser pulse transmitted by the transmitter 210 is received by the receiver 220 may be detected, and thus a ToF of the laser pulse may be detected.

For example, the processor 120 may calculate a cross-correlation function between the receiving signal and the reference signal. As the cross-correlation function is a function indicating a degree of a correlation between two functions, the cross-correlation function between the receiving signal and the reference signal may output a value proportional to the correlation between the two signals. For example, assuming that the receiving signal is $f_0(t)$ and the reference signal is $g_0(t)$, the cross-correlation function between the receiving signal and the reference signal may be calculated by Mathematical Expression 1 below.

$$\int_{-\infty}^{\infty} f_0(x) g_0(t+x) dx \qquad \text{[Mathematical Expression 1]}$$

The processor 120 may determine a time point when the calculated value of the cross-correlation function is maximum. Alternatively, the processor 120 may determine the time point when the calculated value of the cross-correlation function exceeds a preset threshold. The preset threshold may be determined by the processor 120, but the disclosure is not limited thereto. The preset threshold may be determined by an external input.

The processor 120 may determine, to be a ToF, a time period from a first time point at which the laser pulse generated based on the reference signal is transmitted to a second time point at which the calculated value of the cross-correlation function is maximum. Alternatively, the processor 120 may determine, to be a ToF, the time period from the first time point at which the laser pulse generated based on the reference signal is transmitted to a third time point at which the calculated value of the cross-correlation function exceeds a preset threshold.

The processor 120 may calculate a distance to the object by using the ToF and speed of a laser pulse.

Figure 2:
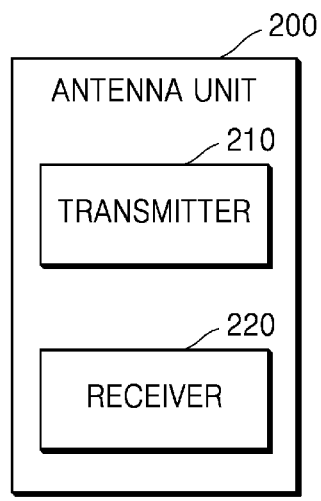
FIG. 2 is a block diagram of an example of an antenna unit according to an example embodiment.

FIG. 2 is a block diagram of an example of an antenna unit 200 according to an example embodiment.

The antenna unit 200 may include a transmitter 210 and a receiver 220.

The transmitter 210 may include a light source for generating a laser pulse. For example, the light source may include an apparatus for generating light in an infrared range. When the light in an infrared range is used, it may be prevented to be mixed with natural light in a visible range including solar light. However, the disclosure is not limited thereto, and the transmitter 210 may include a light source for generating light in various wavelength ranges and may generate a plurality of light in different wavelength ranges.

The transmitter 210 may include a light source such as a laser diode (LD), an edge emitting laser, a vertical-cavity surface emitting laser (VCSEL), a distributed feedback laser, a light-emitting diode (LED), and a super luminescent diode (SLD). However, but the disclosure is not limited thereto.

In an example embodiment, the transmitter 210 may transmit the laser pulse generated based on the reference signal. The reference signal may determine the characteristics of a laser pulse. For example, the laser pulse may have an intensity corresponding to the value of the reference signal or a frequency corresponding to the frequency of the reference signal. The LiDAR device 100 may change the characteristics of the laser pulse transmitted by the transmitter 210 by adjusting the characteristics of the reference signal. The laser pulse transmitted by the transmitter 210 may be reflected after hitting the object.

The receiver 220 may include a plurality of sensors for sensing a laser pulse. The receiver 220 may obtain a receiving signal from the received laser pulse. For example, the receiver 220 may further include a photodetector for converting the received laser pulse to an electrical signal, and the electrical signal output by the photodetector may correspond to the receiving signal. For example, the photodetector may include at least one of an avalanche photo-diode (APD) or a single photo-avalanche diode (SPAD), but the disclosure is not limited thereto.

Figure 3:
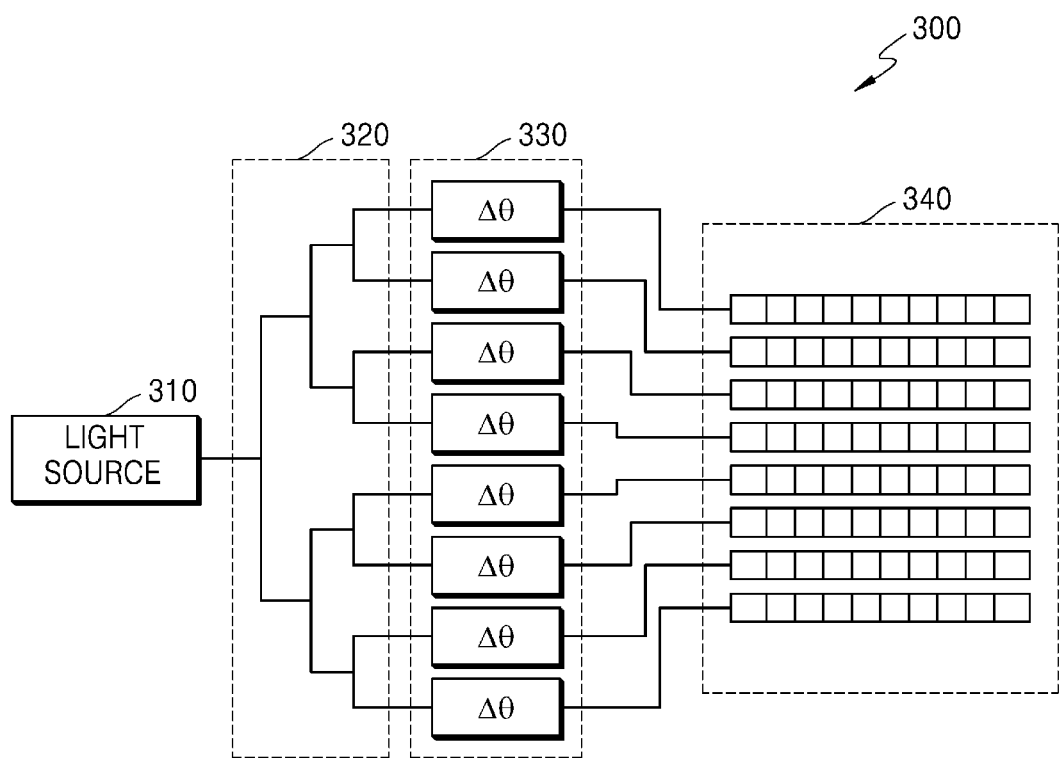
FIG. 3 is a block diagram of an example of a transmitter according to an example embodiment.

FIG. 3 is a block diagram of an example of a transmitter 300 according to an example embodiment The transmitter 300 may transmit a laser pulse by steering the laser pulse in a mechanical or non-mechanical method. For example, the transmitter 300 may transmit a laser pulse by steering the laser pulse by using a micro electro mechanical system (MEMS), a rotating motor, a mirror, or a lens.

In an example embodiment, the transmitter 300 may steer a scan angle of the laser pulse by using an optical phased array (OPA) in a non-mechanical method. In an example embodiment, the transmitter 300 may include a light source 310, a splitter 320, a phase shifter 330, and an antenna array 340.

The light source 310 may generate a laser pulse. The light source 310 may include a laser diode (LD), a laser, a LED, and a SLD, but the disclosure is not limited thereto. Furthermore, the light source 310 may include an optical pumping laser, a solid laser, a liquid laser, a gas laser, a semiconductor laser, a chemical laser, and a pulse laser, but the disclosure is not limited to the listed types.

The splitter 320 may include an optical branch element that splits an input laser pulse into a plurality of laser pulses and outputs the split laser pulses. The splitter 320 may evenly split an input laser pulse and output the evenly split laser pulses. For example, the splitter 320 may be formed on a bulk-Si substrate.

The phase shifter 330 may change the phase of the input laser pulse and output a laser pulse having a changed phase. For example, the phase shifter 330 may change the phase of a laser pulse that passes through a waveguide by applying any one of heat, light, current, voltage, and pressure to the waveguide. For example, the phase shifter 330 may be formed on a semiconductor substrate. For example, the phase shifter 330 may include a resistive heater, a PIN-diode type phase shifter, a PN-diode type phase shifter, and a silicon-insulator-silicon capacitive (SISCAP) phase shifter, but the disclosure is not limited thereto.

As the phase shifter 330 changes the phase of a laser pulse, the laser pulse transmitted by the antenna array 340 may be steered. In other words, by controlling the phase shifter 330, the scan angle of the laser pulse transmitted by the transmitter 300 may be steered.

The antenna array 340 may include discrete antenna elements. The antenna elements may include horns, dipoles, and microstrip patches, but the disclosure is not limited thereto. The antenna elements may correspond to respective channels and may be connected to output ends of the phase shifter 330. In this state, the channel may signify a path through which a laser pulse passes.

Figure 4:
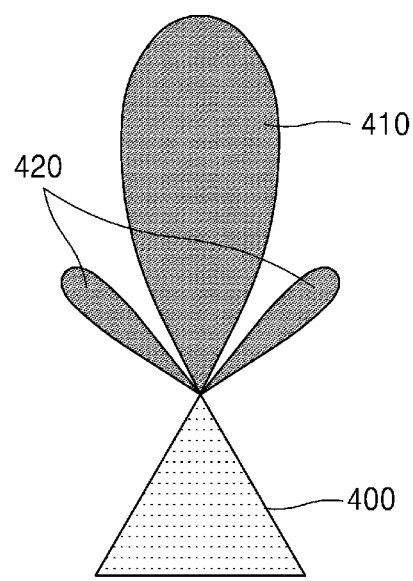
FIG. 4 illustrates an example of a radiation pattern of a LiDAR device, according to an example embodiment.

FIG. 4 illustrates an example of a radiation pattern of a LiDAR device 400, according to an example embodiment.

When the LiDAR device 400 is controlled to transmit a laser pulse at a desired scan angle, a laser pulse having a higher intensity is transmitted from an antenna array at a scan angle, a main lobe 410 may be generated at the scan angle. Ideally, only the main lobe 410 is to be generated. However, in an actual operation, side lobes 420 are generated at angles different from the scan angle.

The main lobe 410 may denote a laser pulse transmitted at a desired angle, and the side lobe 420 may denote laser pulses transmitted at undesired angles. In other words, the main lobe 410 may denote a laser pulse transmitted at a scan angle, and the side lobe 420 may denote laser pulses transmitted at angles other than the scan angle. Although FIG. 4 illustrates one main lobe as the main lobe 410 and two side lobes as the side lobes 420, the side lobes 420 of various angles and various intensities may be generated. For example, the side lobe 420 may include a grating lobe having the same intensity as that of the main lobe 410.

When an interval between antenna elements of the antenna array is less than or equal to the half of the wavelength of a laser pulse, the generation of the side lobe 420 may be restricted. However, as the interval between the antenna elements decreases, thermal coupling between the antenna elements may be severe. Furthermore, as a considerable number of the antenna elements is necessary to narrow the divergence angle of a laser pulse, it may be difficult to arrange the considerable number of antenna elements at intervals that is less than or equal to the half of the wavelength of the laser pulse.

Figure 5:
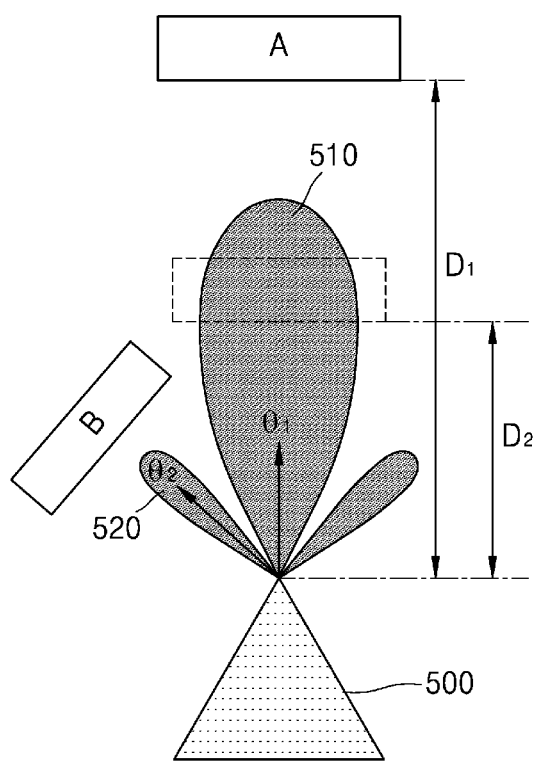
FIG. 5 illustrates an example in which a LiDAR device measures a distance, according to an example embodiment.

FIG. 5 illustrates an example in which a LiDAR device 500 measures a distance, according to an example embodiment.

When the LiDAR device 500 transmits a laser pulse at a scan angle $\theta_1$, a main lobe 510 may be generated at the scan angle $\theta_1$, and a side lobe 520 may be generated at an angle $\theta_2$. When an object A and object B are located at $\theta_1$ and $\theta_2$, respectively, the LiDAR device 500 may receive not only a laser pulse formed as the main lobe 510 is reflected from the object A, but also a laser pulse formed as the side lobe 520 is reflected from the object B. In other words, as the received laser pulse is affected by the side lobe 520, the side lobe 520 may distort a distance measurement at the scan angle $\theta_1$. For example, although the object A is actually apart by a distance $D_1$, the object A may be measured to be located at a distance $D_2$ due to the distortion by the side lobe 520.

As described above with reference to FIG. 4, controlling the generation of a side lobe by changing the structure of an antenna array is a difficult problem. Accordingly, for accurate distance measurement, a method of correcting distortion by a side lobe is needed.

In the following description, a method of measuring a distance by using the antenna unit 110 and the processor 120 of the LiDAR device 100 of FIG. 1 according to example embodiments is described below in detail.

Figure 6:
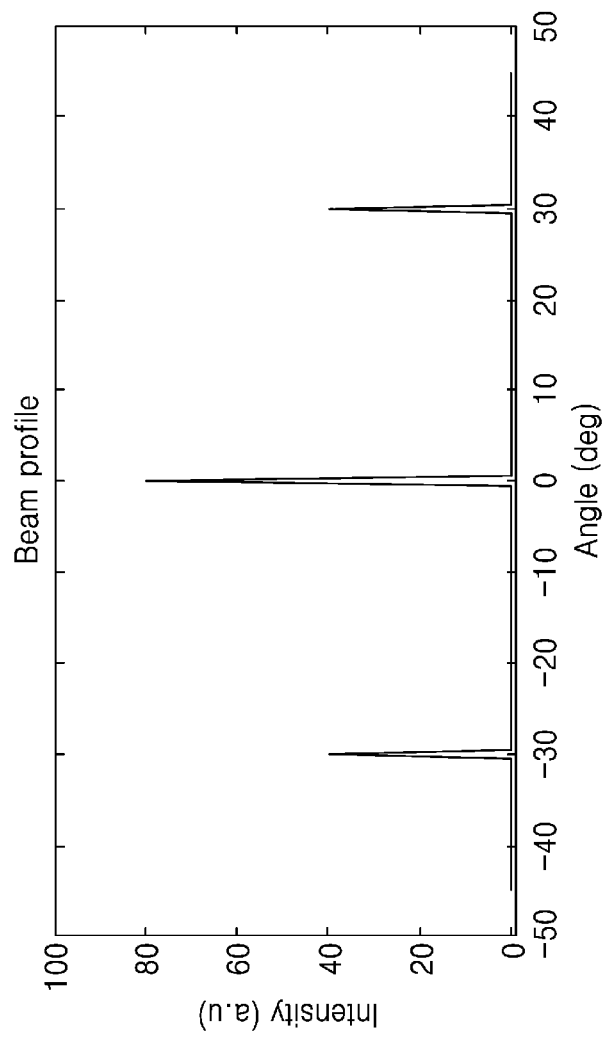
FIG. 6 illustrates an example of a method of obtaining an angle at which a side lobe is generated, according to an example embodiment.
Figure 6:
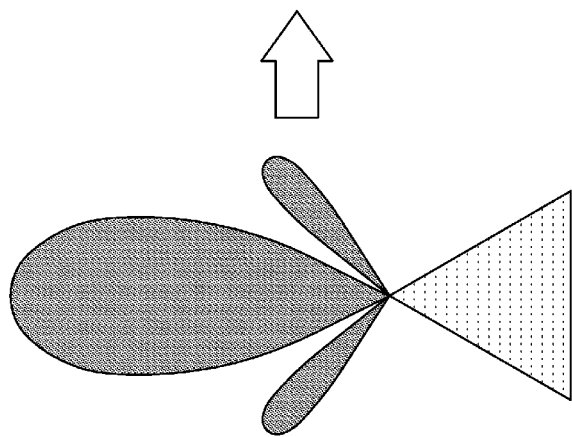

FIG. 6 illustrates an example of a method of obtaining an angle at which a side lobe is generated, according to an example embodiment.

A radiation pattern of the antenna unit 110 may be measured. The radiation pattern may be measured before or after the antenna unit 110 is mounted on the LiDAR device 100. The radiation pattern may be measured by an external measurement apparatus such as a photodetector, a thermal camera, or an infrared (IR) camera.

The external measurement apparatus or the processor 120 may obtain a beam profile indicating the intensity of a laser pulse with respect to a scan angle based on the measured radiation pattern. Furthermore, the external measurement apparatus or the processor 120 may obtained, from the obtained beam profile, an angle at which a side lobe is generated with respect to a main lobe, an intensity of a main lobe, an intensity of a side lobe, and a ratio of the intensity of a side lobe to the intensity of a main lobe.

For example, from the beam profile of FIG. 6, angles at which the side lobes are generated with respect to the main lobe, that is, angles of −30° and 30°, an intensity of the side lobe, that is, 40 a.u. (arbitrary unit), an intensity of the main lobe, that is, 80 a.u., and a ratio of the intensity of the side lobe to the intensity of the main lobe, that is, 0.5, may be obtained.

Figure 7:
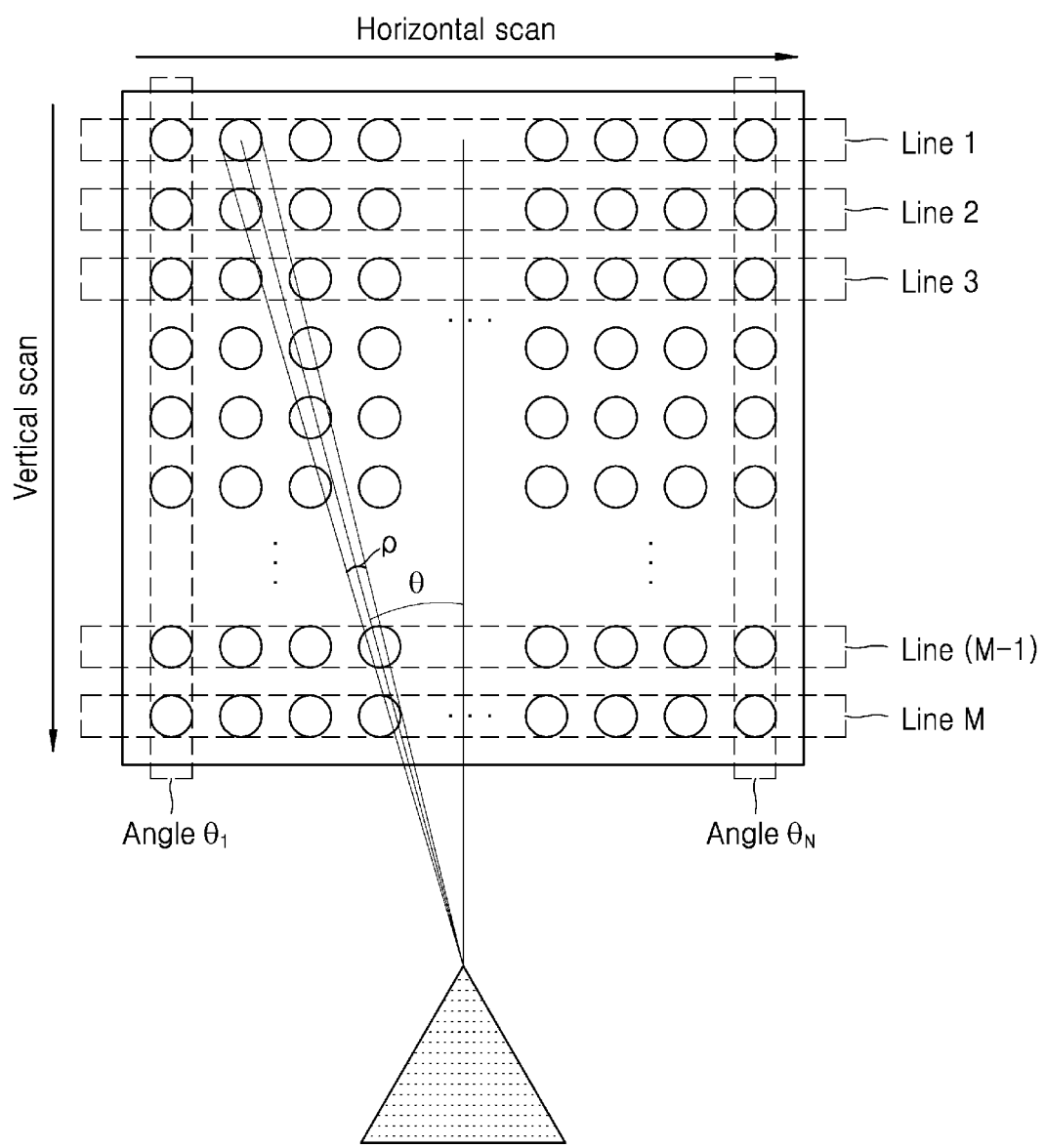
FIG. 7 illustrates an example of a method of operating a LiDAR device, according to an example embodiment.

FIG. 7 illustrates an example of a method of operating a LiDAR device, according to an example embodiment.

In FIG. 7, footprints of a laser pulse transmitted by the transmitter 210, 300 of the antenna unit 110, 200 are illustrated with respect to a field of view of the LiDAR device 100. A footprint may be generated due to a divergence angle ρ of a laser pulse.

The transmitter 210, 300 of the antenna unit 110, 200 may transmit a laser pulse by changing a scan angle θ in a horizontal direction. In this state, the scan angle θ may denote an angle in the horizontal direction in which a laser pulse is transmitted with respect to a field of view of the LiDAR device 100. FIG. 7 illustrates footprints by the laser pulses transmitted at scan angles $θ_1 \ldots θ_N$.

The transmitter 210, 300 may transmit laser pulses by changing the scan angle θ in horizontal direction for each scan line. For example, the transmitter 210, 300, when completed transmission of a laser pulse for SCAN Line 1, may transmit a laser pulse by changing the scan angle θ in the horizontal direction for SCAN Line 2 and finally transmit a laser pulse in the horizontal direction for SCAN Line M.

The transmitter 210, 300 may change the scan angle θ of a laser pulse by using a phase shifter. The transmitter 210, 300 may change a scan line in which a laser pulse is irradiated, by changing the wavelength of the laser pulse.

Alternatively, the transmitter 210, 300 may transmit a laser pulse by changing a scan angle in a vertical direction.

The horizontal direction and the vertical direction are set based on FIG. 7. The horizontal direction and the vertical direction may denote any two directions orthogonal to each other.

Alternatively, the transmitter 210, 300 may transmit a laser pulse by changing the scan angle in various directions. For example, as the transmitter 210, 300 transmits a laser pulse by changing the scan angle in a circumferential direction, footprints may form a concentric circular shape.

The receiver 220 of the antenna unit 110, 200 may obtain a receiving signal by converting the received laser pulse. For example, the receiver 220 may obtain a receiving signal from the laser pulse by using an analog-to-digital (AD) converter. A value of the receiving signal may denote the intensity of the received laser pulse.

The receiver 220 may obtain a receiving signal corresponding to the scan angle θ by changing the received laser pulse. For example, the receiver 220 may obtain a receiving signal corresponding to the scan angle $θ_1$ of SCAN Line 1, a receiving signal corresponding to a scan angle $θ_2$ of SCAN Line 1, and finally a receiving signal corresponding to a scan angle $θ_N$ of SCAN Line M.

The processor 120 may correct an influence by the side lobe in the receiving signal. The processor 120 may correct receiving signals for the respective scan lines. For example, the processor 120 may receive all receiving signals corresponding to SCAN Line 1 and correct the obtained receiving signals, receive all receiving signals corresponding to SCAN Line 2 and correct the obtained receiving signals, and finally receive all receiving signals corresponding to SCAN Line M and correct the obtained receiving signals. The processor 120 may obtain ToF of a laser pulse by using a correlation between the corrected receiving signal and the reference signal.

Figure 8:
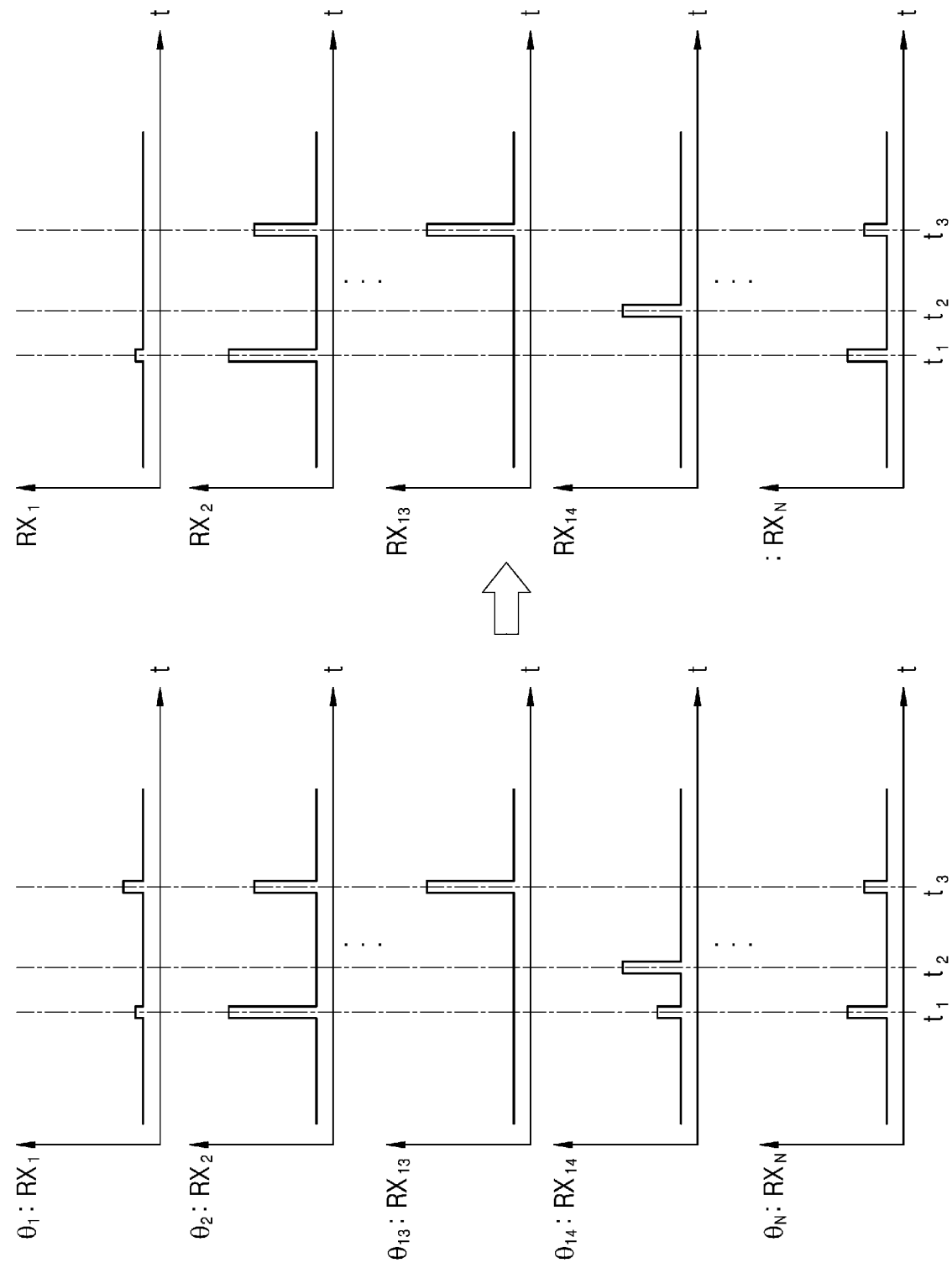
FIG. 8 illustrates an example of a method of correcting a receiving signal, according to an example embodiment.

FIG. 8 illustrates an example of a method of correcting a receiving signal, according to an example embodiment.

FIG. 8 illustrates an example in which the processor 120 corrects receiving signals corresponding to any one scan line. For example, the processor 120 may correct the receiving signals corresponding to the scan angles $θ_1 \ldots θ_N$ included in SCAN Line 1 of FIG. 7.

The processor 120 may compare receiving signals $RX_1 \ldots RX_N$ corresponding to scan angles $θ_1 \ldots θ_N$. The value of a receiving signal may present the intensity of a received laser pulse.

The processor 120 may compare the receiving signals $RX_1 \ldots RX_N$ with respect to time. The processor 120 may synchronize the receiving signals $RX_1 \ldots RX_N$ to compare the receiving signals $RX_1 \ldots RX_N$ with respect to time. In an example embodiment, as the receiving signals $RX_1 \ldots RX_N$ are obtained from the received laser pulse at different time points, is may be necessary to synchronize time to compare the receiving signals $RX_1 \ldots RX_N$. For example, the receiving signals $RX_1 \ldots RX_N$ may be synchronized such that the time points when the laser pulses are transmitted are the same.

The comparison of the receiving signals $RX_1 \ldots RX_N$ by the processor 120 with respect to time may have the same meaning as the comparison of the receiving signals $RX_1 \ldots RX_N$ with respect to a distance. This is because the ToF of a laser pulse denotes a distance between the LiDAR device and the object.

The processor 120 may correct the receiving signals by using an angle at which the side lobe is generated with respect to the main lobe of the laser pulse transmitted by the LiDAR device 100. The processor 120 may correct a value of sub-receiving signal corresponding to a scan angle deviated by an angle at which the side lobe is generated from a scan angle corresponding to a main receiving signal, at a time point. The angle at which the side lobe is generated with respect to the main lobe may be obtained in advance. The processor 120 may correct the value of the sub-receiving signal at the time point by using a correction factor that is a ratio of the intensity of a side lobe to the intensity of a main lobe of the LiDAR device. The processor 120 may subtract from the value of the sub-receiving signal by a value obtained by multiplying the correction factor to the value of the main receiving signal. The processor 120 may correct the value of the sub-receiving signal based on Mathematical Expression 2 below.

$$I_{sub\_new}(t_1) = I_{sub\_old}(t_1) - I_{main}(t_1) * (B/A)$$ [Mathematical Expression 2]

In Mathematical Expression 2, $t_1$ denotes a certain time point, $I_{sub\_old}(t_1)$ denotes a value of a sub-receiving signal before correction at the time point $t_1$, $I_{main}(I)$ denotes a value of a main receiving signal at the time point $t_1$, A denotes the intensity of a main lobe, B denotes the intensity of a side lobe, $I_{sub\_new}(t_1)$, denote a value of a sub-receiving signal after correction at the time point $t_1$.

When the value of the sub-receiving signal at the time point is less than a predetermined value, the processor 120 may not correct the value of the sub-receiving signal. The predetermined value may be a value to distinguish a meaningful receiving signal. The value of a sub-receiving signal at the time point being less than a predetermined value may mean that no object to be corrected exists.

For example, the processor 120 may identify a main receiving signal $RX_2$ having the maximum value at the time point $t_1$ among the receiving signals $RX_1 \ldots RX_N$. When a scan angle deviated from a scan angle $\theta_2$ of the main receiving signal $RX_2$ by an angle at which a side lobe is generated is $\theta_{14}$, the processor 120 may correct the value of a sub-receiving signal $RX_{14}$ corresponding to the scan angle $\theta_{14}$ at the time point $t_1$.

For example, the processor 120 may identify a main receiving signal $RX_{14}$ having the maximum value at a time point $t_2$ among the receiving signals $RX_1 \ldots RX_N$. When a scan angle deviated from the scan angle $\theta_{14}$ of the main receiving signal $RX_{14}$ by an angle at which a side lobe is generated is $\theta_2$, the processor 120 may correct the value of a sub-receiving signal $RX_2$ corresponding to scan angle $\theta_2$ at the time point $t_2$. Alternatively, when the processor 120 determines that the value of the sub-receiving signal $RX_2$ at the time point $t_2$ is less than a predetermined value, the processor 120 may not correct the value of the sub-receiving signal $RX_2$ at the time point $t_2$.

For example, the processor 120 may identify a main receiving signal $RX_{13}$ having the maximum value at a time point $t_3$ among the receiving signals $RX_1 \ldots RX_N$. When a scan angle deviated from a scan angle $\theta_{13}$ of the main receiving signal $RX_{13}$ by an angle at which a side lobe is generated is $\theta_1$, the processor 120 may correct the value of a sub-receiving signal $RX_1$ corresponding to the scan angle $\theta_1$ at the time point $t_3$.

Figure 9:
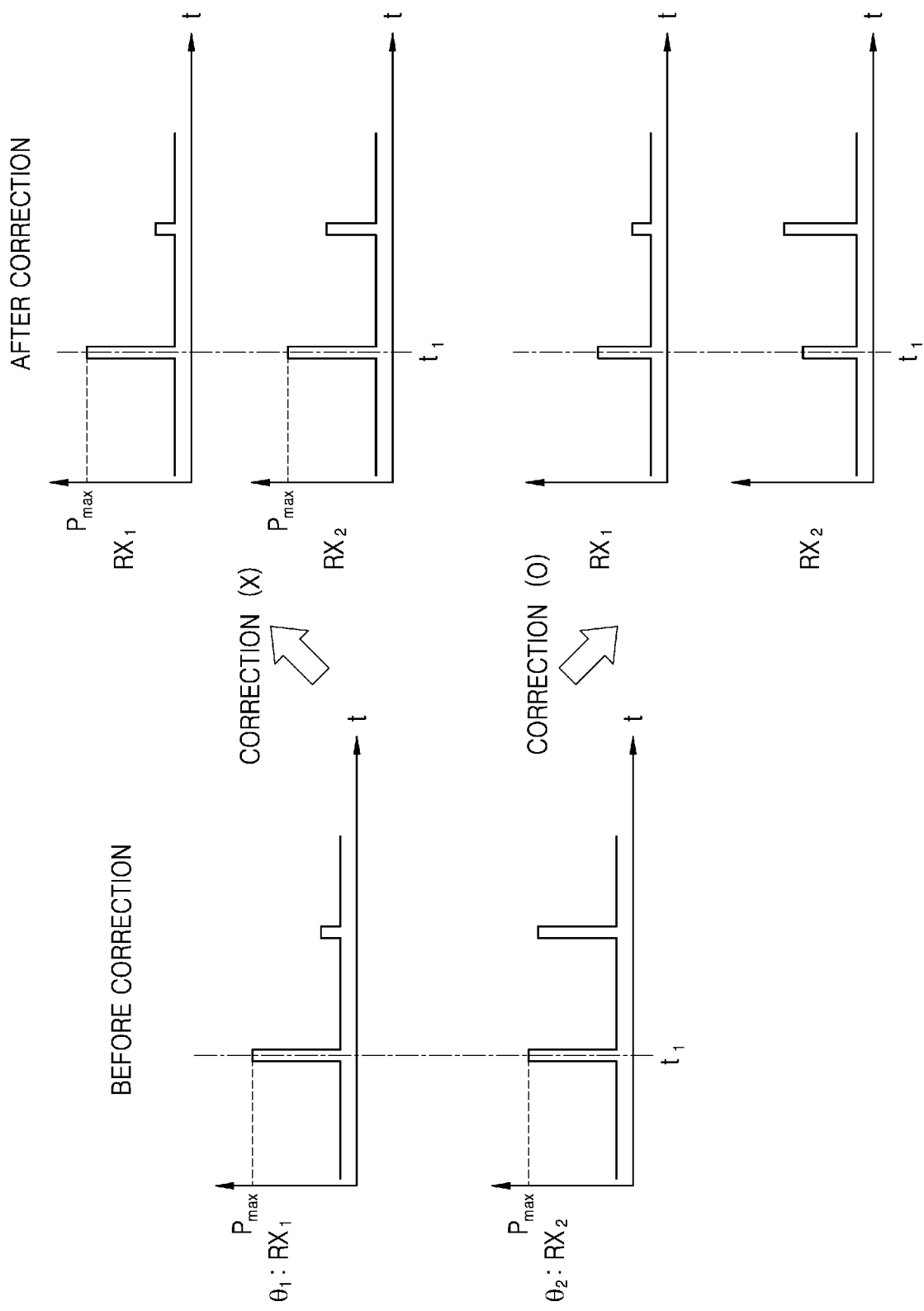
FIG. 9 illustrates another example of a method of correcting a receiving signal, according to an example embodiment.

FIG. 9 illustrates another example of a method of correcting a receiving signal, according to an example embodiment.

The processor 120 may identify a plurality of main receiving signals, each having the maximum value, among the receiving signals with respect to time. In some cases, a plurality of main receiving signals, each having the maximum value, may be identified.

The processor 120 may determine whether a difference between a plurality of scan angles corresponding to the main receiving signals matches an angle at which a side lobe is generated with respect to the main lobe.

The matching of the difference between the scan angles with the angle at which a side lobe is generated may signify that the main receiving signals affect each other. Accordingly, when the processor 120 determines that the difference between the scan angles matches the angle at which a side lobe is generated, the processor 120 may correct each of the main receiving signals. In detail, the processor 120 may subtract, from the value of any one main receiving signal, a value obtained by multiplying a value of another main receiving signal by a ratio of the intensity of a side lobe to the intensity of a main lobe of the LiDAR device. In detail, the processor 120 may correct the values of the main receiving signals based on Mathematical Expression 3 below.

$$I_{main1\_new}(t_1) = I_{main1\_old}(t_1) - I_{main2\_old}(t_1)(B/A) \quad \text{[Mathematical Expression 3]}$$

In Mathematical Expression 3, $t_1$ denotes a certain time point, $I_{main1\_old}(t_1)$ denotes a value of any one main receiving signal before correction at a time point $I_{main2\_old}(t_1)$ denotes a value of another main receiving signal before correction at the time point $t_1$, A denotes an intensity of a main lobe, B denotes an intensity of a sub-lobe, and $I_{main1\_new}(t_1)$ denotes a value of any one main receiving signal after correction at the time point $t_1$.

The non-matching of the difference between the scan angles with the angle at which a side lobe is generated may signify that the main receiving signals do not affect each other. Accordingly, when the processor 120 determines that the difference between the scan angles does not match the angle at which a side lobe is generated, the processor 120 may not correct the main receiving signals.

For example, the processor 120 may identify a first main receiving signal $RX_1$ and a second main receiving signal $RX_2$, each having the maximum value $P_{max}$, at the time point $t_1$. The processor 120 may determine whether the difference between the scan angle $\theta_1$ corresponding to the first main receiving signal $RX_1$ and the scan angle $\theta_2$ corresponding to the second main receiving signal $RX_2$ matches the angle at which a side lobe is generated with respect to the main lobe. When the processor 120 determines that the difference between the scan angle $\theta_1$ corresponding to the first main receiving signal $RX_1$ and the scan angle $\theta_2$ corresponding to the second main receiving signal $RX_2$ matches the angle at which a side lobe is generated, the processor 120 may correct the value of each of the first main receiving signal $RX_1$ and the second main receiving signal $RX_2$ at the time point $t_1$ to be $P_{max} - P_{max}*(B/A)$. Alternatively, when the processor 120 determines that the difference between the scan angle $\theta_1$ corresponding to the first main receiving signal $RX_1$ and the scan angle $\theta_2$ corresponding to the second main receiving signal $RX_2$ does not match the angle at which a side lobe is generated, the processor 120 may not correct the values of the first main receiving signal $RX_1$ and the second main receiving signal $RX_2$ at the time point $t_1$.

Figure 10:
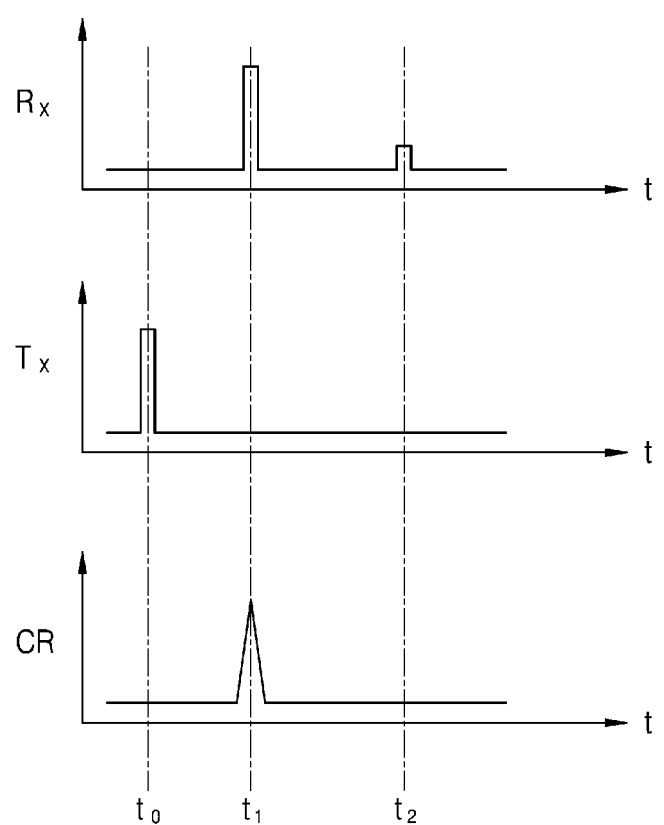
FIG. 10 illustrates an example of a method of obtaining a ToF, according to an example embodiment.

FIG. 10 illustrates an example of a method of obtaining a ToF, according to an example embodiment.

The processor 120 may calculate a distance to the object by using the ToF and speed of a laser pulse. In an example embodiment, the processor 120 may calculate the ToF of a laser pulse by using a cross-correlation function CR between a corrected receiving signal Rx and a reference signal Tx. The processor 120 may calculate the ToF of a laser pulse from a time point when the cross-correlation function CR between the corrected receiving signal Rx and the reference signal Tx is the largest.

For example, as a receiving signal Rx has a greater value at the time point $t_1$ than the time point $t_2$, $t_1$ may be obtained from the cross-correlation function CR, and the ToF may be obtained from a difference between $t_0$ and $t_1$. In this state, $t_0$ may be a time point when a laser pulse generated from the reference signal is transmitted.

Figure 11:
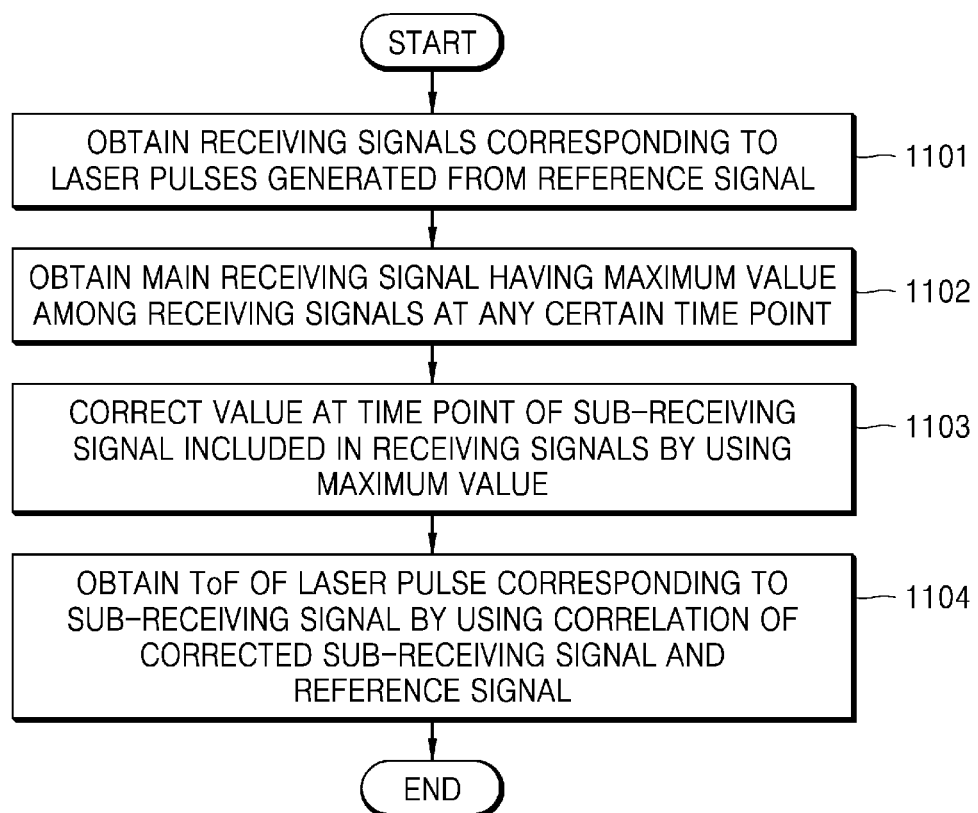
FIG. 11 is a flowchart of a method of operating a LiDAR device, according to an example embodiment.

FIG. 11 is a flowchart of a method of operating a LiDAR device, according to an example embodiment. Referring to FIG. 11, a method of operating a LiDAR device is an algorithm that is processed time-serially in the LiDAR device 100 of FIG. 1.

In operation 1101, the processor 120 may obtain receiving signals corresponding to laser pulses generated from a reference signal. The antenna unit 110 may convert the reference signal generated by the processor 120 and transmit a laser pulse, and receive a reflected laser pulse. The antenna unit 110 may change a scan angle in one direction in a field of view of the LiDAR device 100 and transmit a laser pulse. The processor 120 may store the obtained receiving signals in the memory 130.

In operation 1102, the processor 120 may obtain a main receiving signal having the maximum value at a certain time point among the receiving signals. The processor 120 may read out the receiving signals stored in the memory 130 and then compare the values of the receiving signals. The processor 120 may synchronize the receiving signals and then compare the values of the receiving signals for each time point.

In operation 1103, the processor 120 may correct, at a certain time point, a value of a sub-receiving signal included in the receiving signals, by using the maximum value. The processor 120 may correct the value of the sub-receiving signal corresponding to a scan angle deviated from the scan angle of the main receiving signal by an angle at which a side lobe is generated, with respect to the main lobe. The processor 120 may correct the value of the sub-receiving signal at a certain time point by performing an operation of subtracting a value obtained by multiplying a value of the main receiving signal at the certain time point by a ratio of the intensity of a side lobe to the intensity of a main lobe from the value of the sub-receiving signal at the certain time point.

In operation 1104, the processor 120 may obtain the ToF of a laser pulse corresponding to the sub-receiving signal by using a correlation of the corrected sub-receiving signal and the reference signal. The processor 120 may calculate the ToF of a laser pulse corresponding to the sub-receiving signal from a time point when the value of the cross-correlation function between the corrected sub-receiving signal and the reference signal is the largest.

Figure 12:
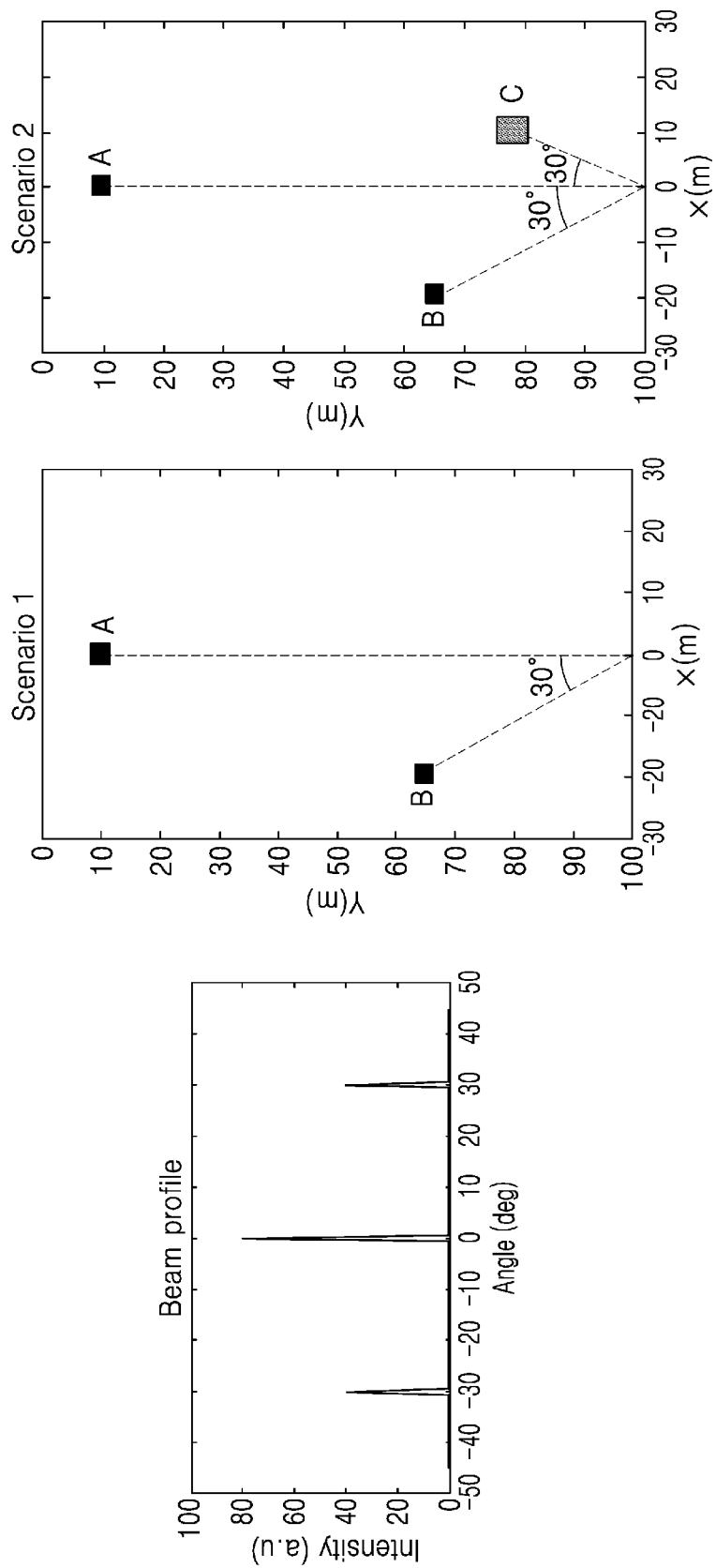
FIG. 12 includes graphs for describing an experiment of measuring a distance by using a LiDAR device, according to an example embodiment.

FIG. 12 includes graphs for describing an experiment of measuring a distance by using a LiDAR device, according to an example embodiment.

In the experiment, the frequency and pulse width of a laser pulse transmitted by the transmitter 210, 300 of the antenna unit 110, 200 were set to 1 MHz and 10 ns, respectively. Furthermore, when the transmitter 210, 300 is on, the transmitter 210, 300 of the antenna unit 110, 200 was set to transmit a laser pulse having an intensity of 100 a.u. When the transmitter is off, the transmitter 210, 300 of the antenna unit 110, 200 was set to transmit a laser pulse having an intensity of 0 a.u. Furthermore, the sampling rate of the receiver 220 of the antenna unit 110, 200 was set to be 1 GHz. Furthermore, the field of view of the LiDAR device 100 was set to be −45° to 45°, the angle at which a side lobe is generated was set to be −30° and 30° with respect to the main lobe, the intensity of a main lobe was set to be 80 a.u., the intensity of a side lobe was set to be 40 a.u., the correction factor that is a ratio of the intensity of a side lobe to the intensity of a main lobe was set to be 0.5, and the divergence angle was set to be 0.5°.

Experiments were performed regarding two scenarios. In the first scenario, it is assumed that an object A is located at a distance of 90 m and at an angle of 0° with respect to the field of view of the LiDAR device 100, and an object B is located at 40 m and at −30°. In the second scenario, it is assumed that the object A is located at a distance of 90 m and at an angle of 0° with respect to the LiDAR device 100, the object B is located at 40 m and at −30°, and an object C is located at 25 m and at −30°.

Figure 13:
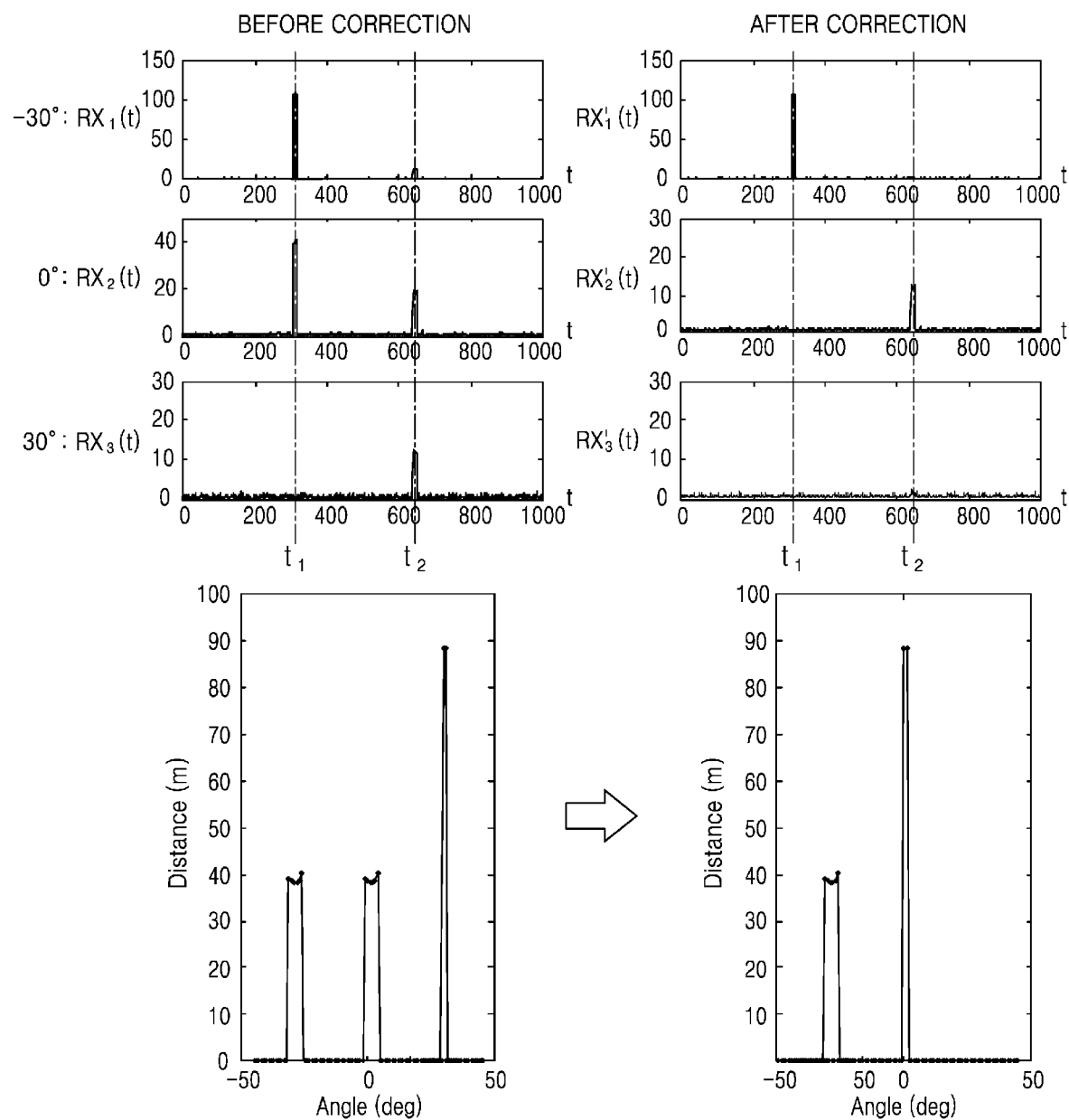
FIG. 13 illustrates a result of an experiment according to the first scenario, according to an example embodiment.

FIG. 13 illustrates a result of an experiment according to the first scenario, according to an example embodiment.

According to a result of the experiment, a receiving signal $RX_1(t)$ corresponding to a scan angle of −30°, a receiving signal $RX_2(t)$ corresponding to a scan angle of 0°, and a receiving signal $RX_3(t)$ corresponding to a scan angle of 30° were obtained.

$RX_1(t_1)$ that is a value with respect to $t_1$ of the receiving signal $RX_1(t)$ is about 100 a.u., $RX_2(t_1)$ that is a value with respect to $t_1$ of the receiving signal $RX_2(t)$ is about 40 a.u., and $RX_3(t_1)$ that is a value with respect to $t_1$ of the receiving signal $RX_3(t)$ is about 0 a.u. $RX_1(t_2)$ that is a value with respect to $t_2$ of the receiving signal $RX_1(t)$ is about 10 a.u., $RX_2(t_2)$ that is a value with respect to $t_2$ of the receiving signal $RX_2(t)$ is about 20 a.u., and $RX_3(t_2)$ that is a value with respect to $t_2$ of the receiving signal $RX_3(t)$ is about 10 a.u.

The receiving signals $RX_1(t)$, $RX_2(t)$, and $RX_3(t)$ are corrected by the processor 120, and thus corrected receiving signals $RX_1'(t)$, $RX_2'(t)$, and $RX_3'(t)$ are obtained.

A main receiving signal having a maximum value is obtained by the processor 120 among the receiving signals $RX_1(t)$, $RX_2(t)$, and $RX_3(t)$ with respect to the time point $t_1$. According to the result of the experiment, as $RX_1(t_1)$ has a maximum value of about 100 a.u., $RX_1(t)$ is obtained as a main receiving signal.

The processor 120 corrects a sub-receiving signal. A sub-receiving signal to be corrected includes the receiving signal $RX_2(t)$ corresponding to the angle of 0° that is an angle deviated by an angle of 30° that is an angle at which a side lobe is generated, from a scan angle of −30° corresponding to the main receiving signal $RX_1(t)$.

The processor 120 removes, from $RX_2(t_1)$, a value obtained by multiplying $RX_1(t_1)$ by a correction factor. As $RX_2(t_1)$ is about 40 a.u., $RX_1(t_1)$ is about 100 a.u., and the correction factor is 0.5, $RX_2'(t_1)$ may have a value of −10 a.u. that is a result of an expression that 40-100*0.5. Optionally, when $RX_2'(t_1)$ has a negative value, the processor 120 may convert the value to 0.

A main receiving signal having a maximum value is obtained by the processor 120 among the receiving signals $RX_1(t)$, $RX_2(t)$, and $RX_3(t)$ with respect to the time point $t_2$. According to a result of the experiment, as $RX_2(t_2)$ has a maximum value of about 20 a.u., $RX_2(t)$ is obtained as a main receiving signal.

The processor 120 corrects sub-receiving signals. Sub-receiving signals to be corrected include the receiving signals $RX_1(t)$ and $RX_3(t)$ corresponding to the angles of −30° and 30° that are angles deviated by angles of −30° and 30° that are angles at which a side lobe is generated, from a scan angle of 0° corresponding to the main receiving signal $RX_2(t)$.

The processor 120 removes, from $RX_1(t_2)$, a value obtained by multiplying $RX_2(t_2)$ by a correction factor. As $RX_1(t_2)$ is about 10 a.u., $RX_2(t_2)$ is about 20 a.u., and the correction factor is 0.5, $RX_1i(t_2)$ may have a value of 0 a.u. that is a result of an expression that 10-20*0.5.

The processor 120 removes, from $RX_3(t_2)$, a value obtained by multiplying $RX_2(t_2)$ by a correction factor. As $RX_3(t_2)$ is about 10 a.u., $RX_2(t_2)$ is about 20 a.u., and the correction factor is 0.5, $RX_3'(t_2)$ may have a value of 0 a.u. that is a result of an expression that 10-20*0.5.

When the processor 120 measures a distance by using the receiving signals $RX_1(t)$, $RX_2(t)$, and $RX_3(t)$ before correction, the object B is located at a distance of about 40 m and at an angle of −30°, the object A is located at a distance of about 40 m and at an angle of 0°, and the object C is located at a distance of about 90 m and at an angle of 30°. In the first scenario, as the object A is located at 90 m and 0° and the object C does not exist, an incorrect result is obtained. This is because, when a distance is measured with a scan angle of 0°, a side lobe generated at an angle of −30° is reflected by the object B and thus distortion is generated by a received laser pulse.

When the processor 120 measures a distance by using the corrected receiving signals $RX_1'(t)$, $RX_2'(t)$, and $RX_3'(t)$, the object B is located at about 40 m and at −30°, and the object A is located at about 90 m and at 0°. As a result that matches the first scenario, it may be seen that the distortion in the distance measurement due to the side lobe may be corrected.

Figure 14:
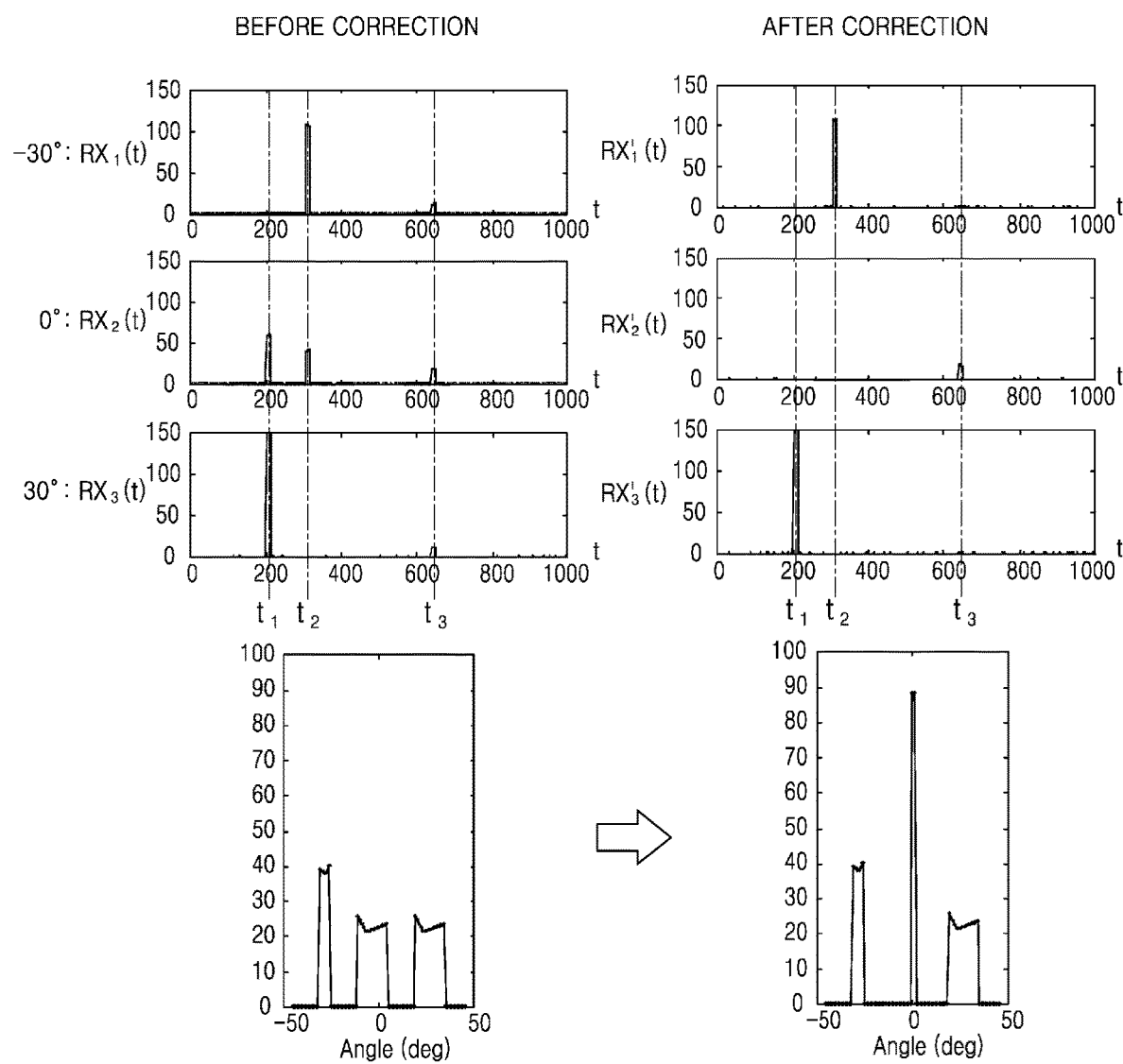
FIG. 14 illustrates a result of an experiment according to the second scenario, according to an example embodiment.

FIG. 14 illustrates a result of an experiment according to the second scenario, according to an example embodiment.

According to a result of the experiment, the receiving signal $RX_1(t)$ corresponding to a scan angle of −30°, the receiving signal $RX_2(t)$ corresponding to a scan angle of 0°, and the receiving signal $RX_3(t)$ corresponding to a scan angle of 30° are obtained.

$RX_1(t_1)$ is about 0 a.u., $RX_2(t_1)$ is about 50 a.u., and $RX_3(t_1)$ is about 150 a.u. $RX_1(t_2)$ is about 100 a.u., $RX_2(t_2)$ is about 40 a.u., and $RX_3(t_2)$ is about 0 a.u. $RX_1(t_3)$ is about 10 a.u., $RX_2(t_3)$ is about 20 a.u., and $RX_3(t_3)$ is about 10 a.u.

As the processor 120 corrects the receiving signals $RX_1(t)$, $RX_2(t)$, and $RX_3(t)$, the corrected receiving signals $RX_1'(t)$, $RX_2'(t)$, and $RX_3'(t)$ are obtained.

The processor 120 obtains a main receiving signal having a maximum value among the receiving signals $RX_1(t)$, $RX_2(t)$, and $RX_3(t)$ with respect to the time point $t_1$. According to a result of the experiment, as $RX_3(t_1)$ has a maximum value of about 10 a.u., $RX_3(t)$ is obtained as a main receiving signal.

The processor 120 corrects a sub-receiving signal. The sub-receiving signal to be corrected is the receiving signal $RX_2(t)$ corresponding to 0° that is an angle deviated by −30° that is the angle at which a side lobe is generated, from the scan angle of 30° corresponding to the main receiving signal $RX_3(t)$.

The processor 120 removes from $RX_2(t_1)$ a value obtained by multiplying $RX_3(t_1)$ by a correction factor. As $RX_2(t_1)$ is about 40 a.u., $RX_3(t_1)$ is about 150 a.u., and the correction factor is 0.5, $RX_2'(t_1)$ may have a value of −35 a.u. that is a result of an expression that 40-150*0.5. Optionally, when $RX_2'(t_1)$ has a negative value, the processor 120 may convert the value to 0.

Likewise, the processor 120 corrects the receiving signals with respect to the time points $t_2$ and $t_3$.

When the processor 120 measures a distance by using the receiving signals $RX_1(t)$, $RX_2(t)$, and $RX_3(t)$ before correction, the object B is located at about 40 m and at −30°, the object A is located at about 25 m and at 0°, and the object C is located at about 25 m and at 30°. In the second scenario, as the object A is located at 90 m and at 0°, an incorrect result is obtained. This is because, when a distance is measured at a scan angle of 0°, distortion is generated by a laser pulse that is received as a side lobe generated at −30° is reflected from the object B and a laser pulse that is received as a side lobe generated at 30° is reflected from the object C.

When the processor 120 measures a distance by using the corrected receiving signals $RX_1'(t)$, $RX_2'(t)$, and $RX_3'(t)$, the object B is located at about 40 m and at −30°, the object A is located at about 90 m and at 0°, and the object C is located at about 25 m and at 30°. As a result that matches the second scenario, it may be seen that the distortion in the distance measurement due to the side lobe is corrected.

Figure 15:
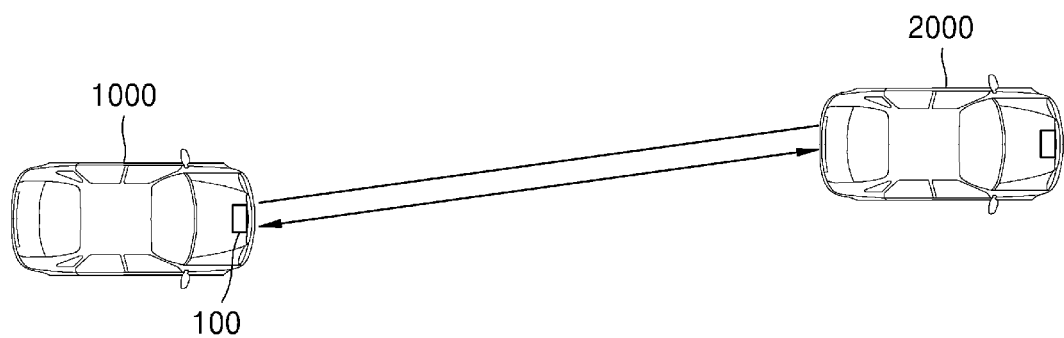
FIG. 15 illustrates a vehicle including a LiDAR device according to an example embodiment.

FIG. 15 illustrates a vehicle including a LiDAR device according to an example embodiment.

As shown in FIG. 15, a host vehicle 1000 may include the LiDAR device 100. The LiDAR device 100 may radiate a light to a nearby vehicle 2000, detect the light when the light is reflected from the nearby vehicle 2000, and determine a distance from the host vehicle 1000 and the nearby vehicle 200 based on the radiated light and the detected light, as described with reference of FIG. 1. The host vehicle 1000 may control an operation (e.g., speed, direction, etc.) of the host vehicle 1000 based on the distance to the nearby vehicle 200 that is determined by the LiDAR device 100.

Although FIG. 15 illustrates that the LiDAR device 100 is mounted in a vehicle, the example embodiment is not limited thereto. For example, the LiDAR device 100 may be included in an airplane, a mobile robot configured to construct a map based on information of distances between the mobile robot and nearby objects, a robot vacuum cleaner configured to move by avoiding collision with nearby obstacles based on information of distances between the robot vacuum cleaner and the nearby obstacles, or a smartphone or a notebook configured to generate and display information of distances to one or more target objects.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of operating a light detection and ranging (LiDAR) device, the method comprising:
   obtaining receiving signals corresponding to reference laser pulses generated from a reference signal;
   obtaining a main receiving signal having a maximum value among the receiving signals with respect to a time point;
   correcting a value of a sub-receiving signal at the time point based on the maximum value of the main receiving signal, wherein the sub-receiving signal comprises a receiving signal corresponding to a scan angle deviated by an angle at which a side lobe is generated from a scan angle of the LiDAR device corresponding to the main receiving signal; and
   obtaining a time of flight (ToF) of a laser pulse corresponding to the sub-receiving signal based on a cross-correlation function between the corrected value of the sub-receiving signal and the reference signal.

2. The method of claim 1, wherein the correcting of the value of the sub-receiving signal comprises subtracting a value obtained by multiplying the maximum value by a correction factor, from the value of the sub-receiving signal at the time point.

3. The method of claim 1, wherein the correcting of the value of the sub-receiving signal comprises correcting the value of the sub-receiving signal at the time point, based on a correction factor that is a ratio of an intensity of the side lobe to an intensity of a main lobe of the laser pulse transmitted by the LiDAR device.

4. The method of claim 1, wherein the correcting of the value of the sub-receiving signal comprises correcting the value of the sub-receiving signal at the time point, based on the angle at which the side lobe is generated with respect to a main lobe of the laser pulse transmitted by the LiDAR device.

5. The method of claim 1, wherein the obtaining of the main receiving signal comprises:
synchronizing the receiving signals; and
comparing the receiving signals by time.

6. The method of claim 1, wherein the obtaining of the receiving signals comprises:
transmitting each of the reference laser pulses for each of scan angles in one direction in a field of view of the LiDAR device; and
obtaining the receiving signals respectively corresponding to the reference laser pulses for each of the scan angles and storing the obtained receiving signal in a memory.

7. The method of claim 1, wherein the obtaining of the main receiving signal comprises:
calculating the cross-correlation function between the sub-receiving signal and the reference signal;
determining a first time point when a value of the cross-correlation function has the maximum value; and
determining the ToF based on a time period from a second time point when the laser pulse transmitted from the LiDAR device corresponds to the sub-receiving signal to the first time point when the value of the cross-correlation function has the maximum value.

8. The method of claim 1, wherein the obtaining of the main receiving signal comprises:
obtaining a first main receiving signal and a second main receiving signal among the receiving signals, each of the first main receiving signal and the second main receiving signal having a first maximum value and a second maximum value with respect to a first time point and a second time point, respectively, and
wherein the correcting of the value of the sub-receiving signal comprises:
obtaining a first scan angle of the first main receiving signal and a second scan angle of the second main receiving signal;
determining whether a difference between the first scan angle and the second scan angle matches the angle at which the side lobe is generated, with respect to a field of view of the LiDAR device;
when the difference between the first scan angle and the second scan angle is determined to match the angle at which the side lobe is generated, correcting a value of the first main receiving signal at the first time point and a value of the second main receiving signal at the second time point; and
when the difference between the first scan angle and the second scan angle is not determined to match the angle at which the side lobe is generated, not correcting the value of the first main receiving signal at the first time point and the value of the second main receiving signal at the second time point.

9. A non-transitory computer readable recording medium having recorded thereon a program for executing the method of claim 1.

10. A light detection and ranging (LiDAR) device comprising:
an antenna configured to transmit and receive laser pulses; and
a processor configured to:
obtain receiving signals corresponding to reference laser pulses generated from a reference signal;
obtain a main receiving signal having a maximum value among the receiving signals with respect to a time point;
correct a value of a sub-receiving signal at the time point based on the maximum value of the main receiving signal, wherein the sub-receiving signal comprises a receiving signal corresponding to a scan angle deviated by an angle at which a side lobe is generated from a scan angle of the LiDAR device corresponding to the main receiving signal, and
obtain a time of flight (ToF) of a laser pulse corresponding to the sub-receiving signal based on a cross-correlation function of the corrected sub-receiving signal and the reference signal.

11. The LiDAR device of claim 10, wherein the processor is further configured to subtract a value obtained by multiplying the maximum value by a correction factor, from the value of the sub-receiving signal at the time point.

12. The LiDAR device of claim 10, wherein the processor is further configured to correct the value of the sub-receiving signal at the time point, based on a correction factor that is a ratio of an intensity of the side lobe to an intensity of a main lobe of the laser pulse transmitted by the LiDAR device.

13. The LiDAR device of claim 10, wherein the processor is further configured to correct the value of the sub-receiving signal at the time point, based on the angle at which the side lobe is generated with respect to the main lobe of the laser pulse transmitted by the LiDAR device.

14. The LiDAR device of claim 10, wherein the processor is further configured to synchronize the receiving signals and compare the receiving signals by time.

15. The LiDAR device of claim 10, further comprising a memory,
wherein the processor is further configured to:
transmit each of the reference laser pulses for each of scan angles in one direction in a field of view of the LiDAR device;
obtain the receiving signals respectively corresponding to the reference laser pulses for each of the scan angles; and
store the obtained receiving signal in the memory.

16. The LiDAR device of claim 10, wherein the processor is further configured to:
calculate the cross-correlation function between the sub-receiving signal and the reference signal;
determine a first time point when a value of the cross-correlation function has the maximum value; and
determine a time period from a second time point when the laser pulse transmitted from the LiDAR device corresponds to the sub-receiving signal to the first time point when the value of the cross-correlation function has the maximum value.

17. The LiDAR device of claim 10, wherein the processor is further configured to:
- obtain a first main receiving signal and a second main receiving signal, among the receiving signals, each of the first main receiving signal and the second main receiving signal having a first maximum value and a second maximum value, with respect to a first time point and a second time point, respectively;
- obtain a first scan angle of the first main receiving signal and a second scan angle of the second main receiving signal;
- determine whether a difference between the first scan angle and the second scan angle matches the angle at which the side lobe is generated, with respect to a field of view of the LiDAR device;
- when the difference between the first scan angle and the second scan angle is determined to match the angle at which the side lobe is generated, correct a value of the first main receiving signal at the first time point and a value of the second main receiving signal at the second time point; and
- when the difference between the first scan angle and the second scan angle is not determined to match the angle at which the side lobe is generated, not correct the value of the first main receiving signal at the first time point and the value of the second main receiving signal at the second time point.

* * * * *